(12) United States Patent
Hasenplaugh et al.

(10) Patent No.: US 8,229,109 B2
(45) Date of Patent: Jul. 24, 2012

(54) MODULAR REDUCTION USING FOLDING

(75) Inventors: William C. Hasenplaugh, Jamaica Plain, MA (US); Gunnar Gaubatz, Worcester, MA (US); Vinodh Gopal, Westboro, MA (US)

(73) Assignee: Intel Corporation, Santa Clara, CA (US)

( * ) Notice: Subject to any disclaimer, the term of this patent is extended or adjusted under 35 U.S.C. 154(b) by 1425 days.

(21) Appl. No.: 11/476,432

(22) Filed: Jun. 27, 2006

(65) Prior Publication Data

US 2007/0297601 A1      Dec. 27, 2007

(51) Int. Cl.
*G06F 7/72*      (2006.01)

(52) U.S. Cl. ............ 380/28; 380/30; 708/490; 708/491; 708/620; 708/625; 708/650

(58) Field of Classification Search .............. 380/28, 380/30; 708/491, 492, 620, 625, 650
See application file for complete search history.

(56) References Cited

U.S. PATENT DOCUMENTS

| | | | |
|---|---|---|---|
| 3,980,874 A | 9/1976 | Vora | |
| 4,945,537 A | 7/1990 | Harada | |
| 4,949,294 A | 8/1990 | Wambergue | |
| 5,166,978 A | 11/1992 | Quisquater | |
| 5,274,707 A | 12/1993 | Schlafly | |
| 5,384,786 A | 1/1995 | Dudley et al. | |
| 5,642,367 A | 6/1997 | Kao | |
| 5,920,702 A | 7/1999 | Bleidt et al. | |
| 5,942,005 A | 8/1999 | Hassner et al. | |
| 6,128,766 A | 10/2000 | Fahmi et al. | |
| 6,185,596 B1 | 2/2001 | Hadad et al. | |
| 6,223,320 B1 | 4/2001 | Dubey et al. | |
| 6,396,926 B1 | 5/2002 | Takagi et al. | |
| 6,484,192 B1 | 11/2002 | Matsuo | |
| 6,530,057 B1 | 3/2003 | Kimmitt | |
| 6,609,410 B2 | 8/2003 | Axe et al. | |
| 6,666,381 B1 | 12/2003 | Kaminaga et al. | |
| 6,721,771 B1 | 4/2004 | Chang | |
| 6,732,317 B1 | 5/2004 | Lo | |
| 6,795,946 B1 | 9/2004 | Drummond-Murray et al. | |
| 6,904,558 B2 | 6/2005 | Cavanna et al. | |
| 7,027,597 B1 | 4/2006 | Stojancic et al. | |
| 7,027,598 B1 | 4/2006 | Stojancic et al. | |
| 7,058,787 B2 * | 6/2006 | Brognara et al. | ............ 711/217 |
| 7,171,604 B2 | 1/2007 | Sydir et al. | |
| 7,187,770 B1 | 3/2007 | Maddury et al. | |
| 7,190,681 B1 | 3/2007 | Wu | |
| 7,243,289 B1 | 7/2007 | Madhusudhana et al. | |

(Continued)

FOREIGN PATENT DOCUMENTS

WO      2008002828 A2      1/2008

(Continued)

OTHER PUBLICATIONS

International Search Report & Written Opinion for application # PCT/US2007/071829, (Dec. 12, 2007),10 pages.

(Continued)

*Primary Examiner* — Farid Homayounmehr
*Assistant Examiner* — Helai Salehi

(57) ABSTRACT

Techniques are described to determine N mod M, where N is a number having a width of n-bits, and M is a number having a width of m-bits. The techniques, generally, involve determining $N'=N_{rt2f} \mod M+N_L$ and, subsequently, determining N' mod M.

22 Claims, 8 Drawing Sheets

U.S. PATENT DOCUMENTS

| | | | |
|---|---|---|---|
| 7,343,541 | B2 | 3/2008 | Oren |
| 7,428,693 | B2 | 9/2008 | Obuchi et al. |
| 7,458,006 | B2 | 11/2008 | Cavanna et al. |
| 7,461,115 | B2 | 12/2008 | Eberle et al. |
| 7,543,214 | B2 | 6/2009 | Ricci |
| 2002/0053232 | A1 | 5/2002 | Axe et al. |
| 2002/0126838 | A1 | 9/2002 | Shimbo et al. |
| 2002/0144208 | A1 | 10/2002 | Gallezot et al. |
| 2003/0167440 | A1 | 9/2003 | Cavanna et al. |
| 2003/0202657 | A1* | 10/2003 | She ................................. 380/30 |
| 2003/0212729 | A1 | 11/2003 | Eberle et al. |
| 2004/0083251 | A1 | 4/2004 | Geiringer et al. |
| 2005/0044134 | A1 | 2/2005 | Krueger et al. |
| 2005/0138368 | A1 | 6/2005 | Sydir et al. |
| 2005/0149725 | A1 | 7/2005 | Sydir et al. |
| 2005/0149744 | A1 | 7/2005 | Sydir et al. |
| 2005/0149812 | A1 | 7/2005 | Hall et al. |
| 2005/0154960 | A1 | 7/2005 | Sydir et al. |
| 2006/0059219 | A1 | 3/2006 | Koshy et al. |
| 2006/0282743 | A1 | 12/2006 | Kounavis |
| 2006/0282744 | A1 | 12/2006 | Kounavis |
| 2007/0083585 | A1 | 4/2007 | St Denis et al. |
| 2007/0150795 | A1 | 6/2007 | King et al. |
| 2007/0157030 | A1 | 7/2007 | Feghali et al. |
| 2008/0092020 | A1 | 4/2008 | Hasenplaugh et al. |
| 2008/0144811 | A1 | 6/2008 | Gopal et al. |
| 2009/0157784 | A1 | 6/2009 | Gopal et al. |
| 2009/0158132 | A1 | 6/2009 | Gopal et al. |
| 2009/0164546 | A1 | 6/2009 | Gopal et al. |
| 2009/0168999 | A1 | 7/2009 | Boswell et al. |

FOREIGN PATENT DOCUMENTS

| | | | |
|---|---|---|---|
| WO | 2008002828 | A3 | 1/2008 |
| WO | 2009/012050 | A2 | 1/2009 |
| WO | 2009/012050 | A3 | 3/2009 |
| WO | 2009/082598 | A1 | 7/2009 |
| WO | 2009/085489 | A2 | 7/2009 |
| WO | 2009/085489 | A3 | 8/2009 |

OTHER PUBLICATIONS

Antoon, B. et al., "Comparsion of three modular reduction function", Comparative Description and Evaluation, (Oct. 25, 1993).

Chin, B. L, et al., "Design and Implementation of Long-Digit Karatsuba's Multiplication Alogorithrn Using Tensor Product Formulation", Workshop on Compiler Techniques for High Performance Computing, (2003).

International Preliminary Report on Patentability for PCT Patent Application No. PCT/US2007/071746, mailed on Jan. 15, 2009, 7 pages.

International Preliminary Report on Patentability for PCT Patent Application No. PCT/US2007/071829, mailed on Jan. 15, 2009, 7 pages.

Montgomery: Five, Six, and Seven-Term Karatsuba-Like Formulae; IEEE Transactions on Computers, vol. 54, No. 3, Mar. 2005, 8 pages.

Sedlak: The RSA Cryptography Processor; Institut fur Theoretische Informatik, Germany, Copyright 1998, Springer-Verlag, pp. 95-105, 14 pages total.

Montgomery: Modular Multiplication Without Trial Division; Mathematics of Computation, vol. 44, No. 170, Apr. 1985, pp. 519-521.

Barrett: Implementing the RivestShamir and Adleman Public Key Encryption Algorithm on a Standard Digital Signal Processor; Computer Security LTD, Aug. 1986; Advances in Cryptology—CRYPTO '86, LNCS 263, pp. 311-323; Copyright Springer-Verlag, Berlin, Heidelberg 1987.

Fischer et al: Duality Between Multiplicatio and Modular Reduction; Infineon Technologies AG, Secure Mobile Solutions, Munich, Germany; Intel Corp., Systems Tech. Labl, Hillsboro, OR; pp. 1-13.

Weimerskirch et al: Generalizations of the Karatsuba Algorithm for Polynomial Multiplication; communication Security Group, Dep't of Electrical Engineering & Info. Sciences, Bochum, Germany, Mar. 2002; pp. 1-23.

Koc et al: Analyzing and Comparing Montgomery Multiplication Algorithms; IEEE Micro, 16(3): Jun. 26-33, 1996; Dep't of Electrical & Computer Engineering, OSU, Corvallis, Oregon,; pp. 1-18.

Office Action Received for Chinese Patent Application No. 200610172839.9, mailed on Jan. 8, 2010, 3 pages of Chinese Office Action, and 5 pages of English Translation.

Office Action Received for Chinese Patent Application No. 200610172839.9, mailed on Feb. 6, 2009, 3 pages of Chinese Office Action, and 5 pages of English Translation.

Office Action Received for Chinese Patent Application No. 200610172839.9, mailed on Apr. 15, 2010, 4 pages of Chinese Office Action, and 5 pages of English Translation.

Office Action Received for Chinese Patent Application No. 200610172839.9, mailed on Jul. 30, 2010, 5 pages of English Translation.

Office Action Received for Chinese Patent Application No. 200610172839.9, mailed on Sep. 18, 2009, 4 pages of Chinese Office Action, and 5 pages of English Translation.

Williams, "A Painless Guide to CRC Error Detection Algorithms", Version 3; Aug. 19, 2003, Copyright 1993; 37 pages.

Nedjah et al., "A reconfigurable recursive and efficient hardware for Karatsuba-Ofman's multiplication algorithm", Proceedings of 2003 IEEE Conference on Control Applications, vol. 2, Jun. 23-25, 2003, pp. 1076-1081.

Nedjah et al., "A Review of Modular Multiplication Methods and Respective Hardware Implementation", Informatica, vol. 30, No. 1, 2006, pp. 111-129.

Tenca et al., "A Scalable Architecture for Montgomery Multiplication", Proceedings of the First International Workshop on Cryptographic Hardware and Embedded Systems, Lecture Notes in Computer Science, No. 1717, Springer-Verlag London, UK, 1999, pp. 94-108.

Kounavis et al., "A Systematic Approach to Building High Performance Software—based CRC Generators", Proceedings of the 10th IEEE Symposium on Computers and Communications, ISCC 2005; 8 pages.

Ramabadran et al., "A Tutorial on CRC Computations", Micro, IEEE, IEEE Computer Society, Aug. 1988, pp. 62-75.

Sprachmann, "Automatic Generation of Parallel Circuits", IEEE Design and Test of Computers May-Jun. 2001; pp. 108-114.

Koopman et al., "Cyclic Redundancy Code (CRC) Polynomial Selection for Embedded Networks", The International Conference on Dependable Systems and Networks, DSN—2004, pp. 1-10.

Dhem, "Design of an Efficient Public-Key Cryptographic Library for RISC-Based Smart Cards" Faculte Des Sciences appliquees Laboratoire de Microelectronique, Louvain-la-Neuve, Belgium, May 1998, 198 pages.

Phatak at al., "Fast Modular Reduction for Large Wordlengths via One Linear and One Cyclic Convolution", Proceedings of the 17th IEEE Symposium on Computer Arithmetic, 2005, 8 pages.

"Federal Information Processing Standards Publication 197", Announcing the Advanced Encryption Standard (AES), Nov. 26, 2001, 51 pages.

Lin et al., "High-Speed CRC Design for 10 Gbps applications", ISCAS 2006, IEEE, pp. 3177-3180.

"Number Theory and Public Key Cryptography", Introduction to Number Theory, pp. 1-12, Apr. 24, 1996.

Campobello et al., "Parallel CRC Realization", IEEE Transactions on Computers, vol. 52, No. 10, Oct. 2003, Published by the IEEE Computer Society; pp. 1312-1319.

International Preliminary Report on Patentability for PCT Patent Application No. PCT/US2008/085284, mailed on Jul. 1, 2010, 6 pages.

International Preliminary Report on Patentability received for PCT Application No. PCT/US2008/084571 mailed on Jul. 1, 2010, 6 pages.

International Search Report and Written Opinion for PCT Patent Application No. PCT/US2008/085284, mailed on May 18, 2009, 11 pages.

International Search Report and Written Opinion received for PCT Patent Application No. PCT/US2008/084571, mailed Jun. 18, 2009, 11 pages.

Office Action Received for Taiwan Patent Application No. 096122784, mailed on Nov. 3, 2010, 12 pages of Taiwan Office Action including 6 pages of English Translation.

Office Action received for U.S. Appl. No. 11/610,919, mailed on Jul. 8, 2010, 7 pages.

Office Action received for U.S. Appl. No. 11/959,142, mailed on Jun. 30, 2010, 11 pages.

Office Action received for U.S. Appl. No. 12/291,621, mailed on Dec. 15, 2010, 15 pages.

Park et al., "Analysis of the Variable Length Nonzero Window Method for Exponentiation", 1999 Elsevier Science, Computers & Mathematics with Applications, vol. 37, Issue 7, Apr. 1999, pp. 21-29.

Gordon, Daniel M. "A survey of fast exponentiation methods", Center for Communications Research, Dec. 30, 1997, pp. 1-22.

International Search Report and Written Opinion received for PCT Patent Application No. PCT/US2008/068801, mailed on Dec. 31, 2008, 10 pages.

International Preliminary Report on Patentability received for PCT Patent Application No. PCT/US2008/068801, mailed on Jan. 28, 2010, 6 pages.

Office Action received for U.S. Appl. No. 11/777,538, mailed on Jan. 8, 2010, 9 pages.

Office Action received for U.S. Appl. No. 11/777,538, mailed on Jul. 9, 2010, 6 pages.

Office Action received for U.S. Appl. No. 12/291,621, mailed on Dec. 12, 2010, 15 pages.

* cited by examiner $a_1b_1 = 1101_b * 0111_b = 0101,1011_b$ $a_0b_0 = 0101_b * 0001_b = 0000,0101_b$ $a_1 + a_0 = 1101_b + 0101_b = 1,0010_b$ $b_1 + b_0 = 0111_b + 0001_b = 0,1000_b$ $\text{result} = A_{[a1:a0]} * B_{[b1:b0]} = 2^{2*4} a_1b_1 + 2^4 [(a_1+a_0)] * (b_1+b_0) - a_1b_1 - a_0b_0] + a_0b_0 = 24,069$ $\text{result} = \text{result} + 2^8 * B_{[b1:b0]} = 24,069 + 2^8 * 0111,0001_b = 78,597$ $\text{result} = \text{result} + 2^8 * A_{[a1:a0]} = 24,981 + 2^8 * 1101,0101_b = 107,525$ if ( ( ah = 1) & (bh = 1) ) then result = result + $2^{16}$ = 28,389 + $2^{16}$ = 173,061 = 469 * 369

MODULAR REDUCTION USING FOLDING

BACKGROUND

Cryptography protects data from unwanted access. Cryptography typically involves mathematical operations on data (encryption) that makes the original data (plaintext) unintelligible (ciphertext). Reverse mathematical operations (decryption) restore the original data from the ciphertext. Cryptography covers a wide variety of applications beyond encrypting and decrypting data. For example, cryptography is often used in authentication (i.e., reliably determining the identity of a communicating agent), the generation of digital signatures, and so forth.

Current cryptographic techniques rely heavily on intensive mathematical operations. For example, many schemes use a type of modular arithmetic known as modular exponentiation which involves raising a large number to some power and reducing it with respect to a modulus (i.e., the remainder when divided by given modulus). Mathematically, modular exponentiation can be expressed as $g^e$ mod M where e is the exponent and M the modulus.

Conceptually, multiplication and modular reduction are straight-forward operations. However, often the sizes of the numbers used in these systems are very large and significantly surpass the native wordsize of a processor. For example, a cryptography protocol may require modular operations on numbers 1024 to 4096 bits in length or greater while many processors have native wordsizes of only 32 or 64 bits. Performing operations on such large numbers may be very expensive in terms of time and in terms of computational resources.

DETAILED DESCRIPTION

Figure 1:
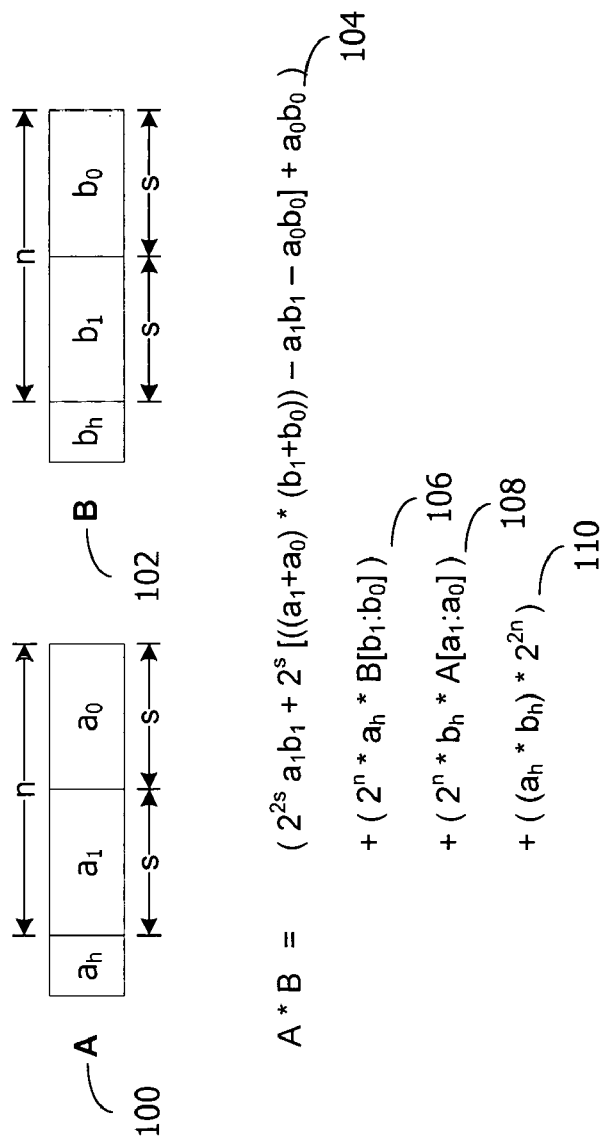
FIGS. 1 and 2 illustrate Karatsuba multiplication.

As described above, a wide variety of cryptographic operations involve multiplication of very large numbers and/or modular reduction. Described herein are a variety of techniques that can reduce the burden of these compute-intensive operations and speed operation of cryptographic systems. These techniques can also be applied in more general purpose, non-cryptographic, computing settings. One such technique involves improving the efficiency of a technique to multiply large numbers known as Karatsuba multiplication. Another technique involves improving the efficiency of modular reduction.

Karatsuba Multiplication

A wide variety of approaches have been developed to perform multiplication of two numbers. A common approach, known as schoolbook multiplication, involves segmenting the operands and performing multiplication operations on the smaller segments. As an example, two n-bit wide numbers A and B can be expressed as a set of smaller sized sub-segments such as:

$$A = a_1 2^s + a_0 \quad [1]$$

$$B = b_1 2^s + b_0 \quad [2]$$

where the $a_0$ and $b_0$ terms represent the s least significant bits of A and B and $a_1$ and $b_1$ represent the remaining more significant bits. In this notation, the subscript x in $a_x$ and $b_x$ represents the ordinal of a segment within a number (e.g., $a_0$ represents the least significant bits of A, $a_1$ the next most significant bits, and so forth).

Using conventional schoolbook multiplication, A and B can be computed using four smaller multiplications:

$$A \times B = a_1 b_1 2^{2s} + (a_0 b_1 + b_0 a_1) 2^s + a_0 b_0 \quad [3]$$

A multiplication technique known as Karatsuba multiplication can reduce the number of segment multiplications. For example, for A and B above, the result of the:

$$(a_0 b_1 + b_0 a_1) \quad [4]$$

terms in [3] can be computed as:

$$[(a_0 + a_1)(b_0 + b_1)] - a_1 b_1 - a_0 b_0 \quad [5]$$

Since $a_1 b_1$ and $a_0 b_0$ form other terms in equation [3], using the values of $a_1 b_1$ and $a_0 b_0$ in equation [5] does not represent additional computational cost. Substituting equation [5] for equation [4] in equation [3], Karatsuba multiplication of A×B can be computed as:

$$A \times B = a_1 b_1 2^{2s} + ([(a_0 + a_1)(b_0 + b_1)] - a_1 b_1 - a_0 b_0) 2^s + a_0 b_0 \quad [6]$$

This substitution trades two adds and a single multiplication for two multiplications. In most cases, this represents a significant gain in computational efficiency.

In the example above, Karatsuba multiplied numbers segmented into two segments (i.e., "two-term Karatsuba multiplication"). Karatsuba, however, can also be applied to other numbers of segments. For example, a three-term Karatsuba multiplication can be defined for numbers A and B as:

$$A = a_2 2^{2s} + a_1 2^s + a_0 \quad [7]$$

$$B = b_2 2^{2s} + b_1 2^s + a_0 \quad [8]$$

$$A \times B = a_2 b_2 2^{4s} + a_1 b_1 2^{2s} + a_0 b_0 + [(a_2 + a_1)(b_2 + b_1) - a_2 b_2 - a_1 b_1] 2^{3s} + [(a_2 + a_0)(b_2 + b_0) - a_2 b_2 - a_0 b_0] 2^{2s} + [(a_0 + a_1)(b_0 + b_1) - a_0 b_0 - a_1 b_1] 2^s \quad [9]$$

where each A and B are divided into three s-bit segments.

Like the two-term Karatsuba multiplication [6], the three-term Karatsuba multiplication [9] substituted multiplication between different ordinal segments (e.g., $a_x b_y$) with multiplication operations on like ordinal segments (e.g., $a_x b_x$) and an addition of segments (e.g., $a_x + a_y$) of the same number. Equations have also been defined for five-term Karatsuba multiplication. These Karatsuba equations share the property that they require, at most, $(t^2 + t)/2$ multiplications where t is the number of terms.

Karatsuba multiplication can be implemented using recursion. For example, in a two-term Karatsuba multiplication of:

$$A \times B = a_1 b_1 2^{2n} + ((a_0 + a_1)(b_0 + b_1) - a_1 b_1 - a_0 b_0) 2^n + a_0 b_0 \quad [6]$$

each smaller segment multiplication can, in turn, be performed using Karatsuba. For example, performing Karatsuba multiplication of A×B can involve Karatsuba multiplication of $a_1 b_1$, $a_0 b_0$, $(a_0 + a_1)(b_0 + b_1)$. These multiplications may involve Karatsuba multiplication of even smaller sub-segments. For example, determining $a_1 b_1$ may involve segmenting $a_1$ and $b_1$ into multiple terms of sub-segments.

A potential problem with this approach, however, is the different sized operands generated. That is, the $(a_0+a_1)$ term and the $(b_0+b_1)$ term may both generate carries from the add operations. The subsequent multiplication of the results of $(a_0+a_1)$ and $(b_0+b_1)$ may spill into an additional native word. This can undermine much of the efficiency of a Karatsuba implementation.

Figure 2:
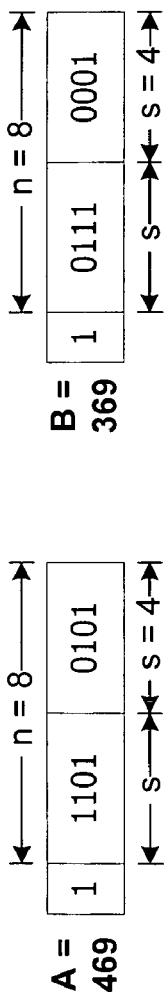
Figure 3:
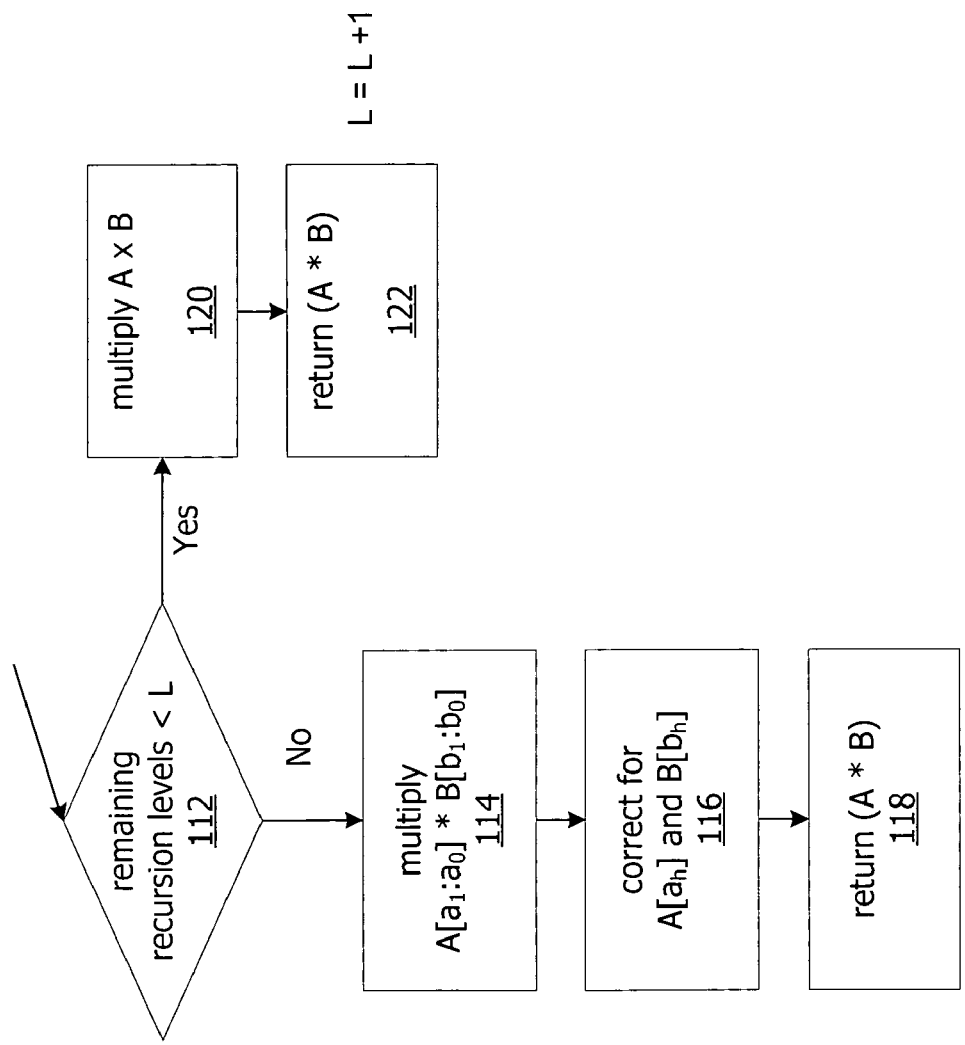
FIG. 3 is a flow chart illustrating a sample implementation of Karatsuba multiplication.

To address the "carry" problem, FIGS. 1-3 illustrate a sample implementation that performs Karatsuba multiplication on the least significant bits of two operands and then corrects the result based on the most significant bits. In greater detail, FIG. 1 illustrates two operands A 100 and B 102 being multiplied. In this example, each operand is n+1 bits wide where n is twice the native wordsize, s, of some processor. In this example, each operand can be segmented into two-terms and an additional high-bit. For example, the s-least significant bits of A form $a_0$, the next s-significant bits form $a_1$, while the most significant bit of A forms $a_h$.

As shown, Karatsuba multiplication can be performed on the s-sized terms using:

$$2^{2s}a_1b_1 2^s[(a_1+a_0)(b_1+b_0)-a_1b_1-a_0b_0]+a_0b_0 \quad [10]$$

The results can then be adjusted based on the values of the most significant bits $a_h$ and $b_h$. For example, as shown, the result can be increased by $$2^n a_h B[b_1:b_0] \quad 106[11]$$

and $$2^n b_h A[a_1:a_0] \quad 108[12]$$

In other words, if $a_h$ is "1", the result is increased by the n-bits of b1:b0 shifted by n bits. Similarly, if $b_h$ is "1", the result is increased by the n-bits of a1:a0 shifted by n bits. These adjustments can be implemented as addition operations, for example:

result=result+$2^n a_h B[b_1:b_0]$ result=result+$2^n b_h A[a_1:a_0]$ or as branches followed by adds:

if $(a_h)$ then result=result+$2^n B[b_1:b_0]$ if $(b_h)$ then result=result+$2^n A[a_1:a_0]$ Finally, if both $a_h$ and $b_h$ are "1", the result is increased by $2^n$ (i.e., $a_h$ $b_h$). This can be implemented using a branch, for example:

if $(a_h$ $b_h)$ then result=result+$2^{2n}$

This combination of addition and one or more branch statements can prevent carries from propagating down into lower level of recursion.

FIG. 2 illustrates operation of the procedure described above to multiply A 100 having a value of 469 and B 102 having a value of 369. As shown, excluding the most significant $a_h$ and $b_h$ bits, Karatsuba multiplication of A[2s-1:0] and B[2s-1:0] yields a value of 24,069. This value is adjusted first for $a_h$ to 78,597, then for $b_h$ to 107,525. Finally, since both $a_h$ and $b_h$ are "1", a most significant bit for $2^{2n=16}$ is added to yield a final answer of 173,061. Again, the values of $a_x b_x$ can be determined by a recursive application of the Karatsuba technique. By slicing off the $a_h$ and $b_h$ bits, the recursion operates on operands of the same convenient size.

FIG. 3 illustrates implementation of this Karatsuba technique in a recursive scheme. As described above, Karatsuba multiplication of operands A and B is performed by multiplication of A[n:0] and B[n:0] 114 followed by correction 116 for the most significant bits, $a_h$ and $b_h$, of A and B. The resulting value is returned 118 up the recursion stack.

Karatsuba multiplication is particularly desirable when the length of the operands is much longer than the native wordsize of a processor. For example, the processor may only have a native wordsize of s compared to longer operands. When n approaches s, the efficiency of Karatsuba decreases and schoolbook multiplication becomes more attractive. Thus, as shown in FIG. 3, depending on current depth of recursion 112, the procedure may either use schoolbook multiplication 120, 122 or Karatsuba 104, 106, 108. In practice, performing the last two levels (e.g., L=2) of recursion using schoolbook multiplication may provide best overall performance.

While FIGS. 1-3 depicted sample implementations, many variations are possible. For example, in FIGS. 1-3 each Karatsuba term was depicted as being s-bits wide. However, the terms need not be of the same bit-width nor do the terms necessarily occupy a single native word. Similarly, while $a_h$ and $b_h$ were described as being single bits, in other implementations $a_h$ and $b_h$ may include multiple bits.

As described above, different Karatsuba equations have been defined for different numbers of terms (e.g., 2, 3, and 5). A canonical Karatsuba decomposition is a number of one of the following six lengths:

$n=2^k$ $n=3\cdot 2^k$ $n=3^2\cdot 2^k$ $n=3^3\cdot 2^k$ $n=3^4\cdot 2^k$ $n=5\cdot 2^k$ where n is the length of a number and k is an integer.

To optimize Karatsuba decomposition, a number may be padded with zeros to conform to a larger canonical form. In order to discern which canonical Karatsuba decomposition to use the work, w, for each can be computed and the smallest selected:

$$w_0 = 3^{\lceil \log_2 n \rceil}$$

$$w_1 = \left(\frac{3^2+3}{2}\right)\cdot 3^{\lceil \log_2 n - \log_2 3 \rceil}$$

$$w_2 = \left(\frac{3^2+3}{2}\right)\cdot 3^{\lceil \log_2 n - 2\log_2 3 \rceil}$$

$$w_3 = \left(\frac{3^2+3}{2}\right)\cdot 3^{\lceil \log_2 n - 3\log_2 3 \rceil}$$

$$w_4 = \left(\frac{3^2+3}{2}\right)\cdot 3^{\lceil \log_2 n - 4\log_2 3 \rceil}$$

$$w_5 = \left(\frac{5^2+5}{2}\right)\cdot 3^{\lceil \log_2 n - \log_2 5 \rceil}$$

The values of w may be computed for different values of n. The results may, for example, be used to form a lookup table indicating the amount to pad a given number based on the lowest w value for a given n.

Modular Reduction Using Folding

In addition to multiplication, many cryptography schemes involve modular reduction (e.g., computation of N mod M). To diminish the expense of modular reduction operations, some systems use a technique known as Barrett modular reduction. Essentially, Barrett computes an estimate of a quotient, $$q = \text{floor}(\text{floor}(N/2^m)\mu/M) \qquad [13]$$

where m is the width of modulus M and $\mu$ is a constant determined by:

$$\mu = \text{floor}(2^{2n}/M). \qquad [14]$$

where n is the width of number N. The value of N mod M can then be determined by computing N−qM, followed by a final subtraction by M if necessary to ensure the final value is less than M. Contributing to Barrett's efficiency is the ability to access a pre-computed value for $\mu$. That is, the value of $\mu$ can be determined based only on the size of N without access to a particular value of N.

Figure 4:
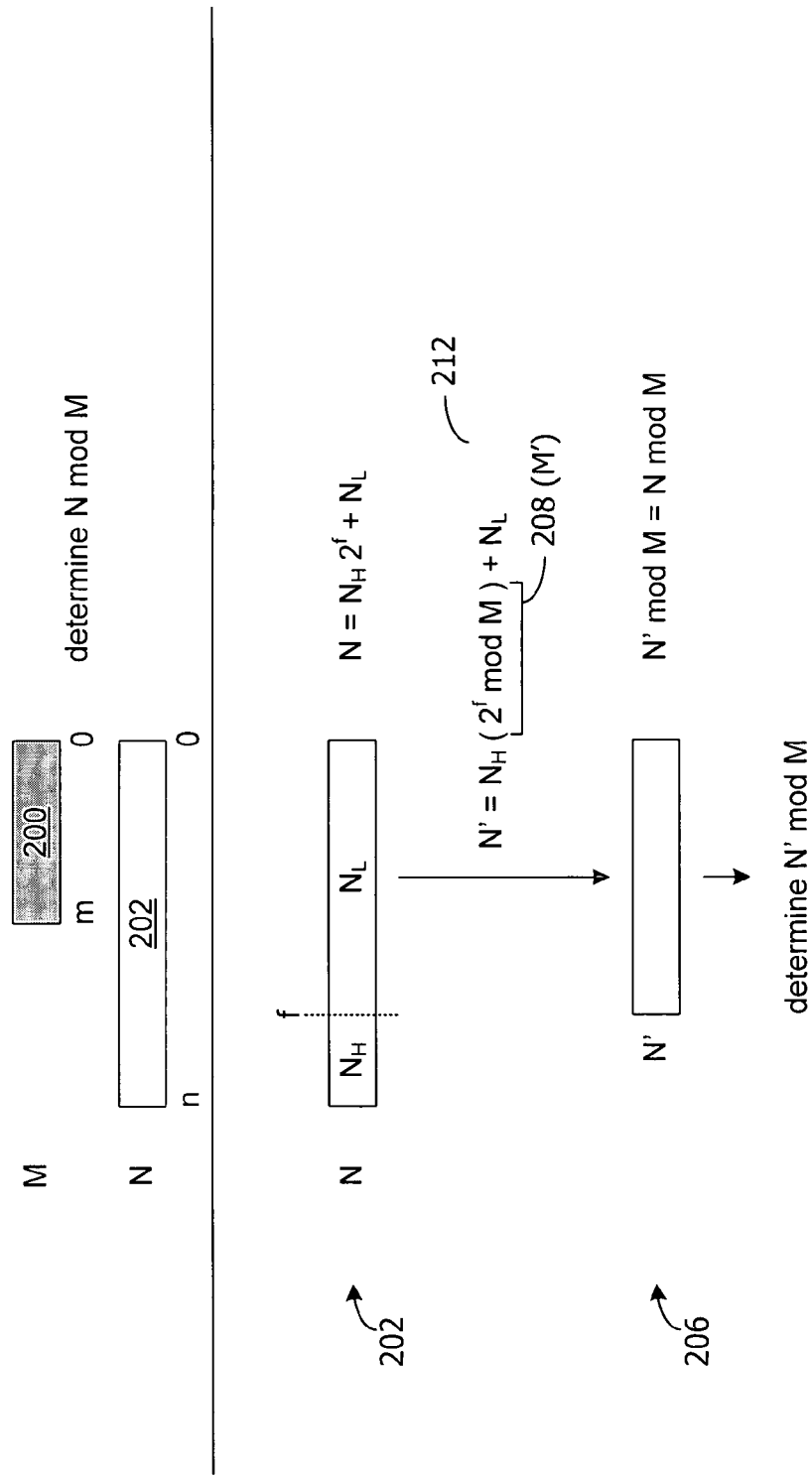
FIGS. 4 and 5 illustrate folding of a number N into a number N', where N≡N'.
Figure 5:
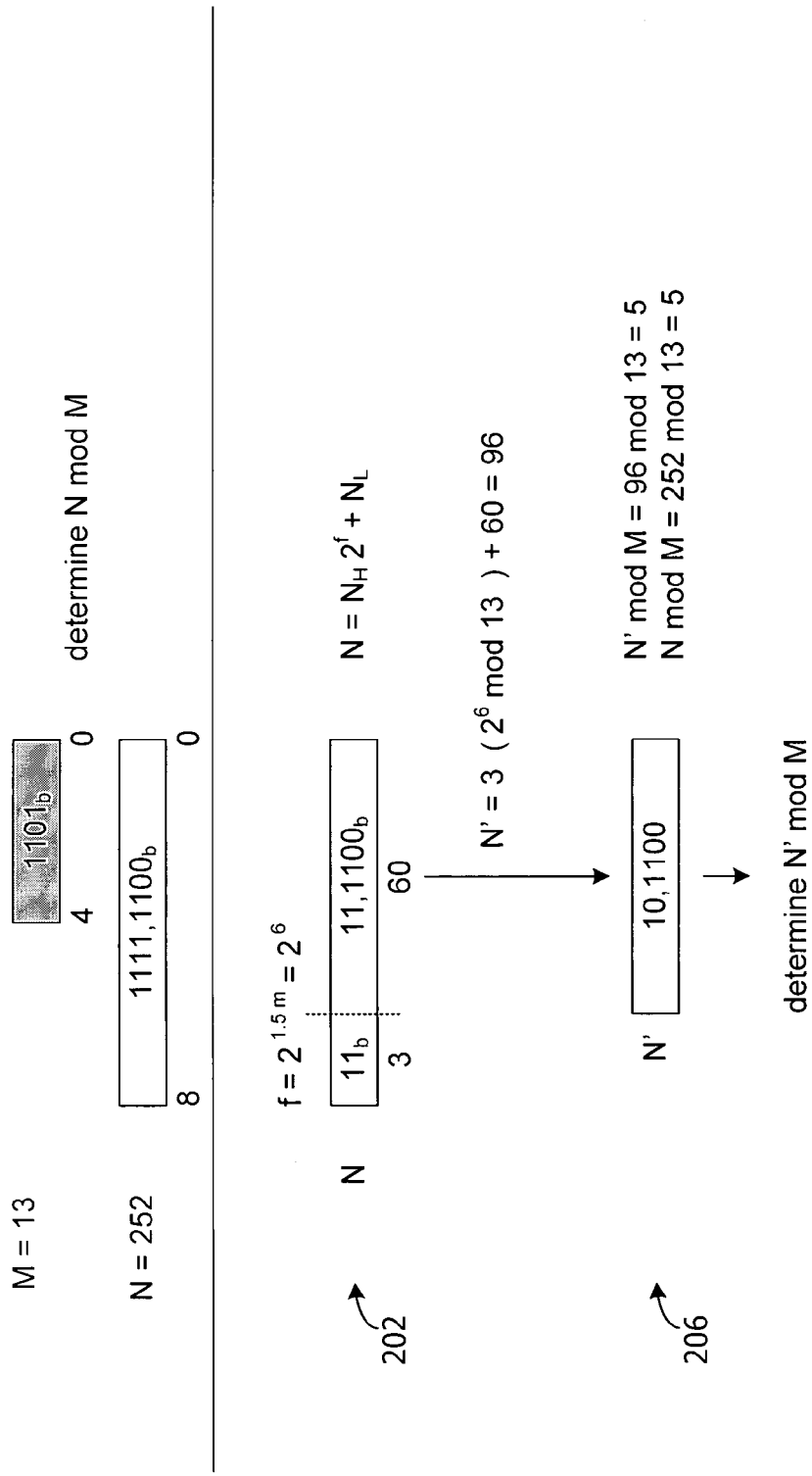
Figure 6:
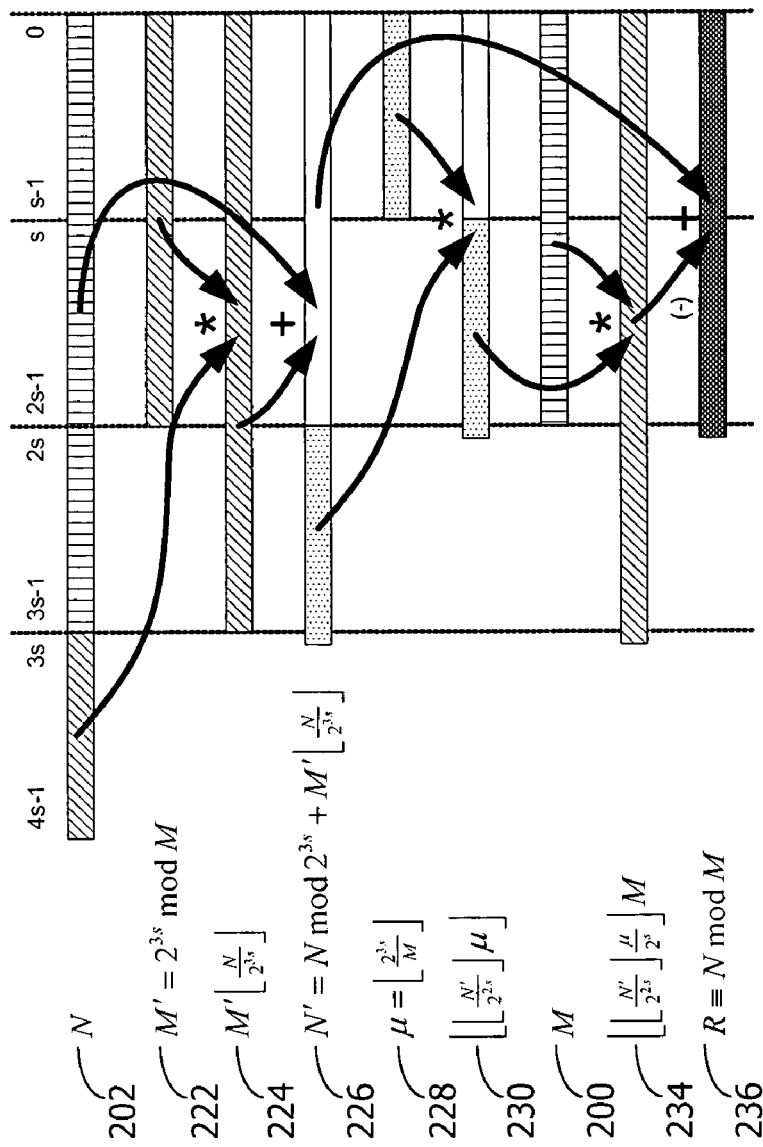
FIG. 6 illustrates determination of N mod M.

Techniques such as Barrett's modular reduction, can lessen the expensive of a modular reduction. FIGS. 4-6 illustrate a technique than can further diminish the computational cost of modular reduction. In particular, FIG. 4 illustrates a technique that "folds" a number N 202 into a smaller width number N' 206. Despite the smaller width, the folding operation determines N' such that N' mod M is the same as N mod M. A traditional operation, such as a classical Barrett modular reduction, can then operate on the smaller N'. By "shrinking" the operand N, subsequent operations involve smaller sized numbers which can reduce the multiplications used to determine a modular remainder. In addition, the larger the number N, the more pronounced the efficiency becomes. For example, sample tests estimate a 27% increase in speed for a 512-bit sized N that jumps to a 177% increase in speed for a 4096-bit sized N.

In greater detail, FIG. 4 depicts a number N 202 having a width of n and a modulus M 200 having a width of m. To determine N mod M, a "folding" operation 212 generates N' from N. As shown, the folding 212 occurs at a folding point, f, that delineates N into higher, $N_H$, and lower, $N_L$, portions of significance. For example, the folding point, f, may be chosen to fall at the mid-point of the length of the modulus and the length of N. For instance, assuming N has a width of 2m (twice the width of the modulus), the folding point may be at the bit position identified by $2^{1.5m}$. Such a folding point can minimize the resulting width of N'. That is, moving the folding point in either direction to expand or shrink $N_H$ or $N_L$ may actually increase the size of N'.

Based on the folding point, N' can be determined as:

$$N' = N_H 2^f \bmod M + N_L \qquad 212[15]$$

The smaller N' can then be used to perform a modular reduction, for example, using the classical Barrett technique.

As shown, determination 212 of N' involves a term of $2^f$ mod M 208 (referred to as M'). The value of $2^f$ mod M can be pre-computed without regard to a particular N value. Pre-computing this value for various values of M and f speeds real-time computation of N' by shifting expensive multiplications to a less time critical period. The pre-computed values for the values of M and f can be stored in a table in memory for fast access. The multiplication of $N_H$ ($2^f$ mod M) may be performed using Karatsuba multiplication, for example, as described above.

To illustrate, FIG. 5 shows an example of folding where N is an 8-bit wide number having a value of 252 (1111,1100b) and M is a 4-bit number having a value of 13 (1101b). As shown, the folding point is selected as $f=2^{1.5m}=2^6$. Computation of N' yields a value of 96. As shown, N and its folded counterpart N' yield the same modular remainder, 5, for the modulus 13. The modular reduction of N' can be performed using any of a variety of modular reduction approaches such as Barrett's.

FIG. 6 depicts an example of a complete determination of N mod M using the techniques described above. In this example, N 202 is of a width n=4s and M 204 is of a width m=2s. As shown, the folding point, f, is $2^{3s}$. As shown, a pre-computed value for $M'=2^{3s}$ mod M 222 can be used to determine $(M')(N_H)$ 224. While FIG. 6 expresses $N_H$ as the value of floor $(N/2^{3s})$, the value of $N_H$ can be more quickly obtained by setting $N_H = N[4s-1:3s]$. The value of $(M')(N_H)$ 224 is added to $N_L$ 226 to complete computation of N'. Again, while FIG. expresses $N_L$ as N mod $2^{3s}$, the value of $N_L$ can be more quickly obtained by setting $N_H = N[3s-1:0]$.

After determination of N', N' mod M can be computed using classical Barrett reduction. In this case the Barrett reduction is computed 230, 234 as:

$$R = N' - \text{floor}(\text{floor}(N'/2^{2s})(\mu/2^s))M \qquad [16]$$

where $\mu$ is determined as floor $(2^{3s}/M)$. Like the value of M', the value of $\mu$ can be pre-computed for a variety of values of s and M. This pre-computation can, again, time-shift expensive operations to periods where real-time operation is not required.

The resultant R 236 may be larger than the modulus M 200. In this comparatively rare case, a subtraction of R=R−M may be used to ensure R<M.

Figure 7:
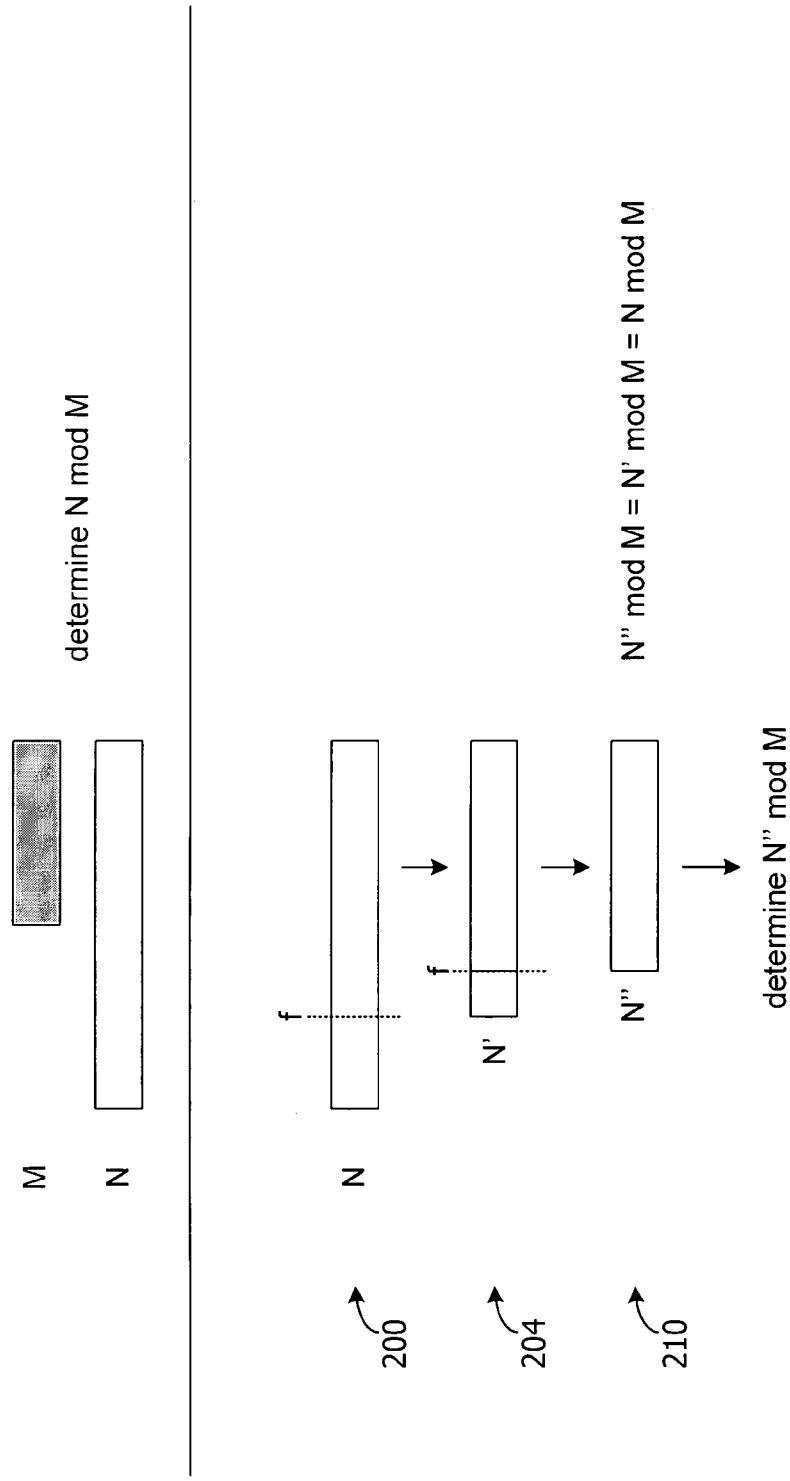
FIG. 7 illustrates iterative folding of a number N.

A single folding operation can significantly improve the efficiency and real-time performance of modular reduction. As shown in FIG. 7, repeated folding can provide further efficiency with respect to the total number of multiplications and ALU operations (e.g., add, subtracts, and shifts) consumed. As shown, N 202 is again folded into N' 204. The resulting N' will often be of width f. In the event N' is of the width f+1, a subtraction operation of N'=N'−(M $2^m$) may be used to "trim" N' though this is not a necessity. As shown, an additional folding operation transforms N' into N'' 206, again, where N''' mod M=N' mod M. This second fold again increases computational efficiency.

The folding point used in the different folding iterations moved from $2^{1.5m}$ for the first iteration to $2^{1.25m}$ for the second. More generally, the folding point for a given iteration may be determined as $2^{(1+2^{-i})m}$ where i is the iteration number.

While FIG. 7 depicted two foldings, additional foldings are possible. However, additional folding may provide diminishing returns and/or actually increase the number of multiplication operations.

Sample Implementation of Modular Exponentiation

The techniques described above can be used to perform a variety of cryptographic operations. For example, the Karatsuba multiplication and folding techniques described above can be combined to perform modular exponentiation.

Again, modular exponentiation involves determining $g^e$ mod M. Performing modular exponentiation is at the heart of a variety of cryptographic algorithms. For example, in RSA, a public key is formed by a public exponent, e-public, and a modulus, M. A private key is formed by a private exponent, e-private, and the modulus M. To encrypt a message (e.g., a packet or packet payload) the following operation is performed:

$$\text{ciphertext} = \text{cleartext}^{e\text{-}public} \bmod M \qquad [17]$$

To decrypt a message, the following operation is performed:

$$\text{cleartext} = \text{ciphertext}^{e\text{-}private} \bmod M. \qquad [18]$$

One procedure for performing modular exponentiation processes the bits in exponent e in sequence from left to right.

Starting with an initial value of A=1, the procedure squares the value for each "0" bit encountered (i.e., A=A*A). For each "1" bit, the procedure both squares the value and multiplies by g (i.e., A=A*A*g). The end result can be used in a modular reduction operation. For example, to determine $3^{1010b}$ mod 5, the procedure operates as follows where g=3, e="1010", and M=5:

|  | A |
|---|---|
|  | 1 |
| exponent bit 1-1 | 1 * 1 * 3 = 3 |
| exponent bit 2-0 | 3 * 3 = 9 |
| exponent bit 3-1 | 9 * 9 * 3 = 243 |
| exponent bit 4-0 | 243 * 243 = 59049 |
| A mod M | 4 |

Instead of performing the modular reduction at the end when a very large number may have been accumulated, modular reduction may be interleaved within the multiplication operations such as after processing every exponent bit or every few exponent bits. For example, to compute $3^{1010b}$ mod 5, the procedure may proceed as follows:

|  | A |
|---|---|
|  | 1 |
| exponent bit 1-1 | 1 * 1 * 3 = 3 |
| A mod M | 3 |
| exponent bit 2-0 | 3 * 3 = 9 |
| A mod M | 4 |
| exponent bit 3-1 | 4 * 4 * 3 = 48 |
| A mod M | 3 |
| exponent bit 4-0 | 3^2 = 9 |
| A mod M | 4 |

Regardless of the particular implementation, use of the Karatsuba multiplication technique described above to both the squaring and "g" multiplication can significantly speed modular exponentiation. Additionally, using folding, the reduction operations consume significantly less processing resources.

Additional computational efficiency can be obtained by storing repeatedly used values. For instance, in the example, the value of g is involved in two different multiplications. In a real-world example of a 2048-bit exponent, the number multiplications using g will be much larger. To improve efficiency of Karatsuba multiplication involving g, different values of $g_i=(g_{H(i)}+g_{L(i)})$ can be stored in a table for repeated use, where i represents the depth of Karatsuba recursion. This caching can save a significant number of cycles that redundantly perform the same addition. Caching other frequently used values such as M' and μ used in folding may also enhance performance if modular reduction occurs multiple times using the same modulus.

An additional optimization may be used when performing multiplication of uneven sized numbers such as multiplication of a 1k sized number by a 2k sized number. Such multiplications may occur in determining Barrett's qM value and in determining $N_H 2^f$ mod M. To take advantage of Karatsuba, a 1k*2k multiplication can be broken up into two 1k*1k operations such as $q*m_h$ and $q*m_l$. Since q is used in both operations the value of $(q_h+q_l)$ need not be determined twice but may instead be stored for further use.

Again, the above is merely an example and the Karatsuba and folding techniques can be used to perform a wide variety of other cryptographic operations as well as other general purpose mathematical applications.

The techniques can be implemented in variety of ways and in a variety of systems. For example, the techniques may be implemented in dedicated digital or analog hardware (e.g., determined by programming techniques described above in a hardware description language such as Verilog(tm)), firmware, and/or as an ASIC (Application Specific Integrated Circuit) or Programmble Gate Array (PGA). The techniques may also be implemented as computer programs, disposed on a computer readable medium, for processor execution. For example, the processor may be a general purpose processor.

Figure 8:
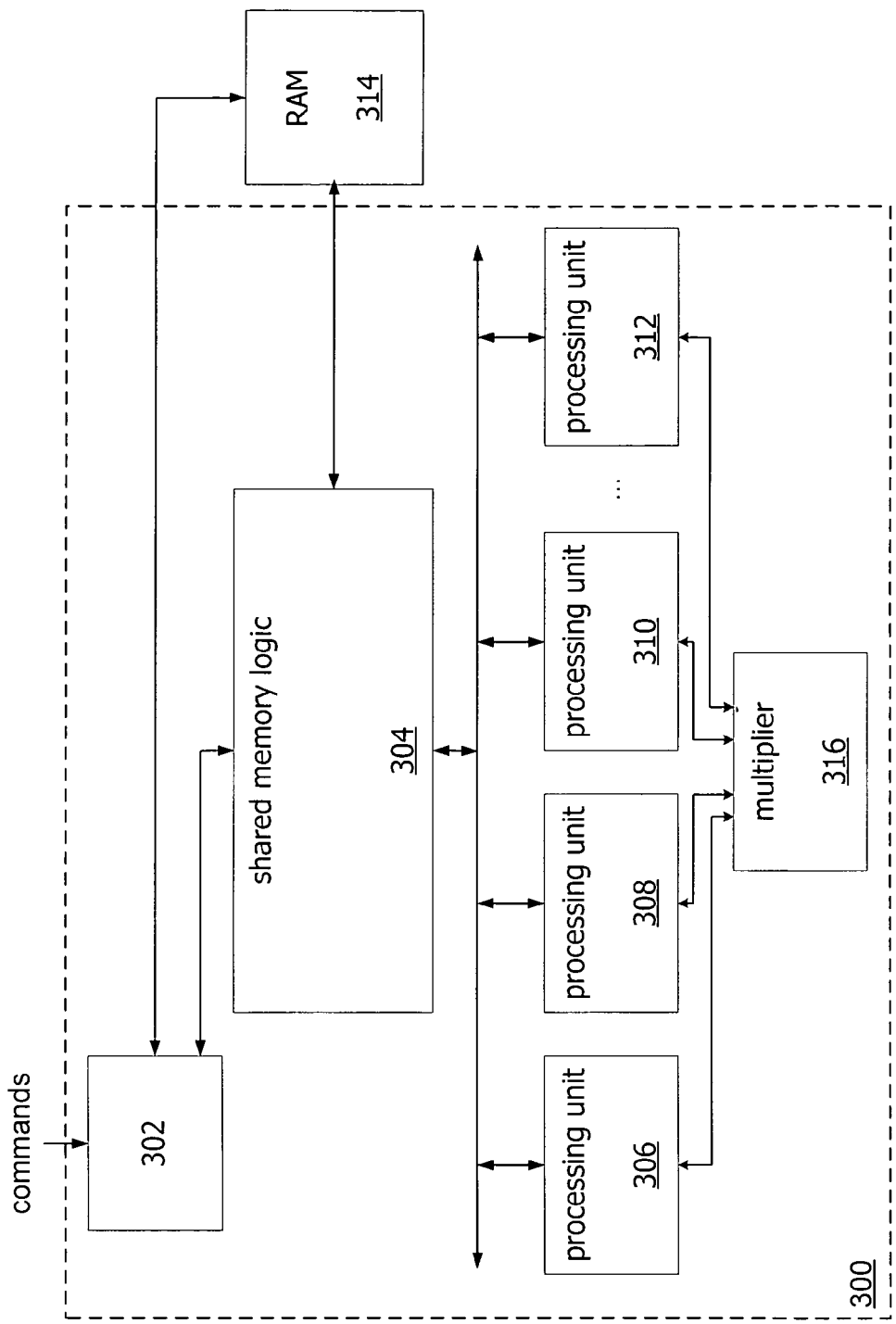
FIG. 8 depicts an architecture to perform Karatsuba multiplication and/or modular reduction.

As shown in FIG. 8, the techniques may be implemented by computer programs executed by a processor module 300 that can off-load cryptographic operations. As shown, the module 300 includes multiple programmable processing units 306-312 and a dedicated hardware multiplier 316. The processing units 306-312 run programs on data downloaded from shared memory logic 304 as directed by a core 302. Other processors and/or processor cores may issue commands to the module 300 specifying data and operations to perform. For example, a processor core may issue a command to the module 300 to perform modular exponentiation on g, e, and M value stored in RAM 314. The core 302 may respond by issuing instructions to shared memory logic 304 to download a modular exponentiation program to a processing unit 306-312 and download the data being operated on from RAM 314, to shared memory 304, and final to processing unit 306-312. The processing unit 306-312, in turn, executes the program instructions. In particular, the processing unit 306-312 may use the multiplier 316 to perform multiplications such as the Karatsuba multiplications used to perform the squarings or "g" multiplications. Upon completion, the processing unit 306-312 can return the results to shared memory logic 304 for transfer to the requesting core. The processor module 300 may be integrated on the same die as programmable cores or on a different die.

Again, FIG. 8 merely illustrates use of a sample architecture for implementing the Karatsuba and folding techniques described above. The techniques, however, can be used in a wide variety of other architectures such as with a programmed traditional general purpose processor.

Other embodiments are within the scope of the following claims.

What is claimed is:

1. A computer program, disposed on a tangible non-transitory computer readable storage medium, comprising instructions for causing circuitry to determine N mod M, where N is a number having a width of n-bits, and M is a number having a width of m-bits, the program to:
   determine N'=NH2f mod M+NL,
      where
         $N_H$ comprises a higher significant portion of N, and
         $N_L$ comprises a lower significant portion of N,
         f comprises a position segmenting N into $N_H$ and $N_L$;
      and determine N"=N'$_H 2^f$ mod M+N'$_L$,
      where
         N'$_H$ comprises a higher significant portion of N', and
         N'$_L$ comprises a lower significant portion of N',
         f' comprises a position segmenting N' into N'$_H$ and N'$_L$; and
      determine N" mod M;
   wherein N" comprises a smaller width than N'.

2. The computer program of claim 1, wherein f comprises a bit within N corresponding to $2^{1.5m}$.

3. The computer program of claim 1, wherein the instructions to determine N' mod M comprise instructions to access a pre-computed value of $2^f$ mod M.

4. The computer program of claim 1, wherein f comprises a bit within N' corresponding to $2^{1.25m}$.

5. The computer program of claim 1, wherein the instructions to determine N" mod M comprise instructions to access a pre-computed value of $2^{f'}$ mod M.

6. The computer program of claim 1, wherein the instructions to determine N" mod M comprise instructions to perform a Barrett modular reduction of N" mod M.

7. The computer program of claim 1, wherein M comprises a modulus of a public key.

8. The computer program of claim 1,
wherein N comprises data included in a packet, and
wherein the instructions further comprise instructions to perform at least one of the following: (1) encrypt the data included in the packet; and (2) decrypt data included in the packet.

9. The computer program of claim 6, wherein the instructions to determine the Barrett modular reduction of N" mod M comprise instructions to access a pre-computed value of floor $(2^{f'}/M)$.

10. A system comprising:
circuitry to determine N mod M, where N is a number having a width of n-bits, and M is a number having a width of m-bits, the circuitry to:
determine $N'=N_H 2^f$ mod $M+N_L$
where
$N_H$ comprises a higher significant portion of N, and
$N_L$ comprises a lower significant portion of N,
f comprises a position segmenting N into $N_H$ and $N_L$; and
determine $N''=N'_H 2^{f'}$ mod $M+N'_L$,
where
$N'_H$ comprises a higher significant portion of N', and
$N'_L$ comprises a lower significant portion of N',
f comprises a position segmenting N' into $N'_H$ and $N'_L$; and
determine N" mod M; and
perform at least one of the following based on the determined N" mod M: (1) encrypt data included in a packet; and (2) decrypt data included in a packet;
wherein N" comprises a smaller width than N'.

11. The system of claim 10, wherein f comprises a bit within N corresponding to $2^{1.5m}$.

12. The system of claim 10, wherein M comprises a modulus of a public key.

13. The system of claim 10, wherein the circuitry comprises programmable circuitry to execute instructions to determine N' and N' mod M.

14. The system of claim 10, further comprising multiple programmable cores integrated on a same die as the circuitry and communicatively coupled to the circuitry.

15. A computer-implemented method to determine N mod M, where N is a number having a width of n-bits, and M is a number having a width of m-bits, the method comprising:
determining, by circuitry, $N'=N_H 2^f$ mod $M+N_L$
where
$N_H$ comprises a higher significant portion of N, and
$N_L$ comprises a lower significant portion of N,
f comprises a position segmenting N into $N_H$ and $N_L$; and
determining, by the circuitry, $N''=N'_H 2^{f'}$ mod $M+N'_L$,
where
$N'_H$ comprises a higher significant portion of N', and
$N'_L$ comprises a lower significant portion of N',
f comprises a position segmenting N' into $N'_H$ and $N'_L$;
determining, by the circuitry, N" mod M; and
performing, by the circuitry, at least one of the following based on the determined N" mod M: (1) encrypting data included in a packet; and (2) decrypting data included in a packet;
wherein N" comprises a smaller width than N'.

16. The computer-implemented method of claim 15, wherein f comprises a bit within N corresponding to $2^{1.5m}$.

17. The computer-implemented method of claim 15, wherein the determining N' mod M comprises accessing a pre-computed value of $2^f$ mod M.

18. The computer-implemented method of claim 15, wherein f' comprises a bit within N' corresponding to $2^{1.25m}$.

19. The computer-implemented method of claim 15, wherein the determining N" mod M comprises performing a Barrett modular reduction of N" mod M.

20. The computer-implemented method of claim 15, wherein M comprises a modulus of a public key.

21. A computer-implemented method, comprising:
accessing data (D) from memory circuitry;
computing, by circuitry, $N=D^k$, where k comprises a portion of a cryptographic key integer;
determining, by the circuitry, the modular remainder of the computed value of N with respect to a modulus M, the determining comprising:
accessing, by the circuitry, a set of at least one constant, each constant in the set of at least one constant corresponding to a value of $2^{f_i}$ mod M, where $f_i$ is an integer representing a bit-position demarcating a high order portion and a low order portion of data;
determining, $N_i$, by the circuitry, for multiple values of i, where $N_i$ mod $M=N_{i-1}$ mod M and $N_i$ has a smaller width than $N_{i-1}$, by adding a low order portion of $N_{i-1}$ with a high order portion of $N_{i-1}$ multiplied by a one of the constants in the set of at least one constant, where i is an integer representing the determining of the number $N_i$ within the sequence determinings;
determining, by the circuitry, a modular remainder of a final determined $N_i$ with respect to the modulus M; and
storing, by the circuitry, the determined modular remainder of the final determined $N_i$ with respect to the modulus M in memory circuitry; and
performing, by the circuitry, at least one of the following based on the determined N modulus M: (1) encrypt data included in a packet; and (2) decrypting data included in a packet.

22. The computer-implemented method of claim 21, wherein determining the modular remainder of the final determined $N_i$ with respect to the modulus M comprises at least one of (1) a table lookup of a modular remainder associated with $N_i$ and (2) a Barrett's modular reduction of the final determined $N_i$ with respect to the modulus M.

* * * * *